J. C. GORDON.
METHOD AND APPARATUS FOR MIXING DOUGH.
APPLICATION FILED APR. 1, 1911.

995,345.

Patented June 13, 1911.

Witnesses

Inventor
James C. Gordon
By Whittemore Hulbert & Whittemore
Atty's

UNITED STATES PATENT OFFICE.

JAMES C. GORDON, OF DETROIT, MICHIGAN.

METHOD AND APPARATUS FOR MIXING DOUGH.

995,345.  Specification of Letters Patent. Patented June 13, 1911.

Application filed April 1, 1911. Serial No. 618,389.

*To all whom it may concern:*

Be it known that I, JAMES C. GORDON, a citizen of the United States of America, residing at Detroit, in the county of Wayne and State of Michigan, have invented certain new and useful Improvements in Methods and Apparatus for Mixing Dough, of which the following is a specification, reference being had therein to the accompanying drawings.

It is the usual practice in the commercial manufacture of bread to employ power-operated machines for beating or mixing the dough prior to baking, and to drive the machines at such a rate of speed as will naturally reduce the working or kneading period. This rapid beating necessarily generates heat, which if allowed to rise beyond a certain degree is destructive to the yeast.

My invention comprehends a method of dough mixing including the absorption of generated heat to an extent to prevent the temperature rising beyond a destructive degree, and as a further step dissipation of the heat in such manner that the cooling medium will be out of contact with the dough mass whereby any tendency toward moistening or drying and crusting the dough by subjecting the surface thereof to the direct action of a cooling body or air currents is avoided.

My invention further resides in the novel and peculiar construction of the apparatus for carrying out this treatment.

Figure 1:
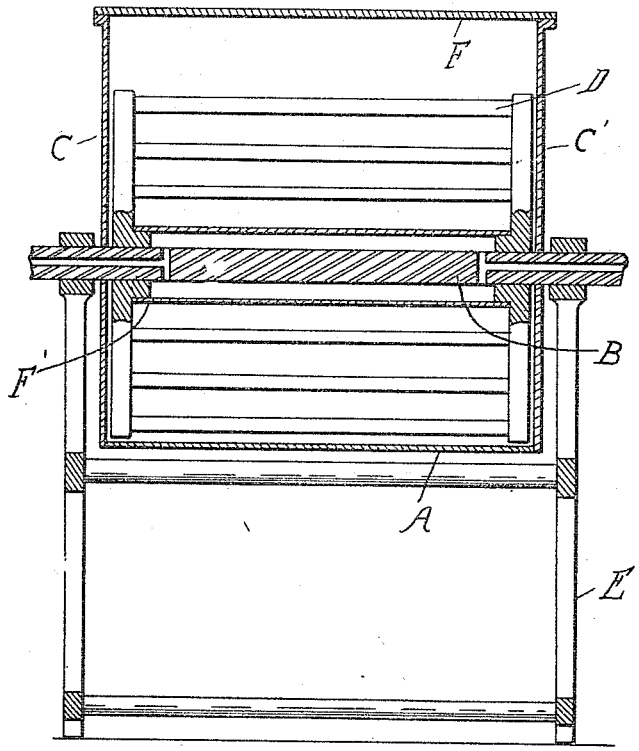
Figure 2:
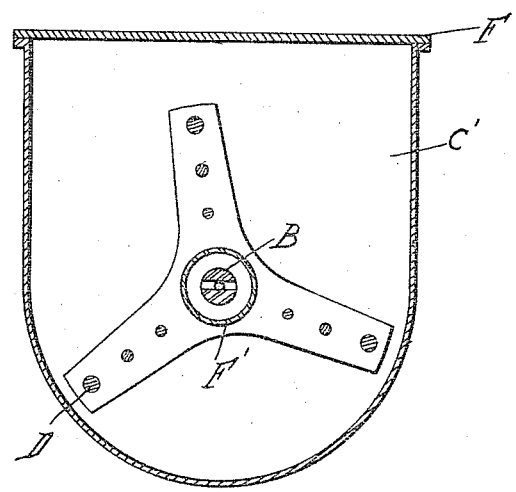

In the drawings,—Figure 1 is a longitudinal section through a dough mixing or beating machine embodying my invention; and Fig. 2 is a cross section thereof.

In the construction illustrated, the reference-letter A represents the receptacle for containing the dough, and in which the dough is kneaded or beaten to the requisite degree prior to baking.

B is a revoluble shaft passing through the receptacle, having mounted thereon at opposite ends the heads C C' carrying the agitator or beater cross bars D,—preferably three in number.

E is a frame or standard upon which the shaft B is journaled, and F is a suitable hinged cover for the receptacle.

For effecting the absorption of the heat I preferably employ a cooler in the character of a physical body maintained at a lower temperature than the dough mass and locate the same centrally within the beater as the most convenient point. It is to be understood, however, that the cooler may be other than a physical agent, and further that in its physical form it may be otherwise positioned provided it will prevent overheating of the dough and will be out of direct contact with the dough mass. In this instance, a jacket or drum F' surrounding the beater shaft with a brine solution circulating therethrough forms the cooling body, the shaft being provided with hollow ends constituting respectively inlet and outlet connections for the brine.

In practice, the heat-dissipating body is cooled by starting the circulation therethrough; the dough ingredients are placed within the receptacle either prior to or after the cooling medium is in operation; the lid or cover closed and the beater started, it being usually run at about sixty revolutions per minute. As the dough mass is formed and kneaded, considerable heat is generated, but on account of the dissipation of the heat at the center of the receptacle the temperature throughout the mass may be maintained at the desired point below the destructive degree for the yeast.

Owing to the position of the cooling medium, it will be obvious that it does not come in contact with the dough mass during the operation of kneading, as the working of the dough is effected at the periphery of the beater. It will of course be understood that particles or fragments of the dough as the beating or working proceeds will drop upon or contact with the cooling body, but the portions are so small that it is entirely immaterial in so far as the results desired are concerned, as the mass of the dough does not have contact with the cooling medium.

From the foregoing it will be apparent that in following out the method described the dough surface is not unduly moistened, as would be the case if direct contact took place between the mass and the cooling surface, because of condensation on such surface. Neither is the dough dried out and the surface crusted, as would happen if the cooling was effected by means of a passing current of air through the receptacle in contact with the dough. The beating or working can therefore be carried out to the desired extent for the purpose of producing the proper texture of dough without any injurious effects upon the dough mass.

What I claim as my invention is,—

1. The process of beating dough which consists in mixing the ingredients, in kneading the mass with a sufficient speed to raise its temperature, and absorbing the generated heat from the dough mass by subjecting the same to the action of a cooler out of direct contact with said mass.

2. The process of beating dough consisting in rapidly beating the dough in the presence of a surface of lower temperature than and out of direct contact with the dough mass.

3. In an apparatus for beating dough, the combination of a receptable, of a rotary dough beater therein designed to lift and carry the dough during rotation, means for driving the beater at a rate of speed sufficient to unduly heat the dough, and a cooler within the receptacle out of contact with the dough mass for absorbing generated heat.

4. An apparatus for beating dough, comprising a receptacle, a rotary dough beater therein designed to lift and carry the dough during rotation, means for driving the beater at a rate of speed sufficient to unduly heat the dough, and a cooler, held out of direct contact with the dough mass during the beating operation, for absorbing generated heat, comprising a drum and means for circulating a fluid cooling medium therethrough.

5. An apparatus for beating dough, comprising a receptacle, a rotary dough beater therein designed to lift and carry the dough, means for driving the beater at a rate of speed sufficient to unduly heat the dough, and a body positioned within the beater maintained at a lower temperature than and out of direct contact with the dough mass.

6. The process of mixing dough consisting in subjecting a mass of dough to the action of beaters, and abstracting generated heat primarily interiorly from the mass.

In testimony whereof I affix my signature in presence of two witnesses.

JAMES C. GORDON.

Witnesses:
  JAMES P. BARRY,
  WILLIAM PAGEL.